May 18, 1943. E. H. LUNKEN ET AL 2,319,245
WINDOW
Filed Feb. 15, 1939 7 Sheets-Sheet 1
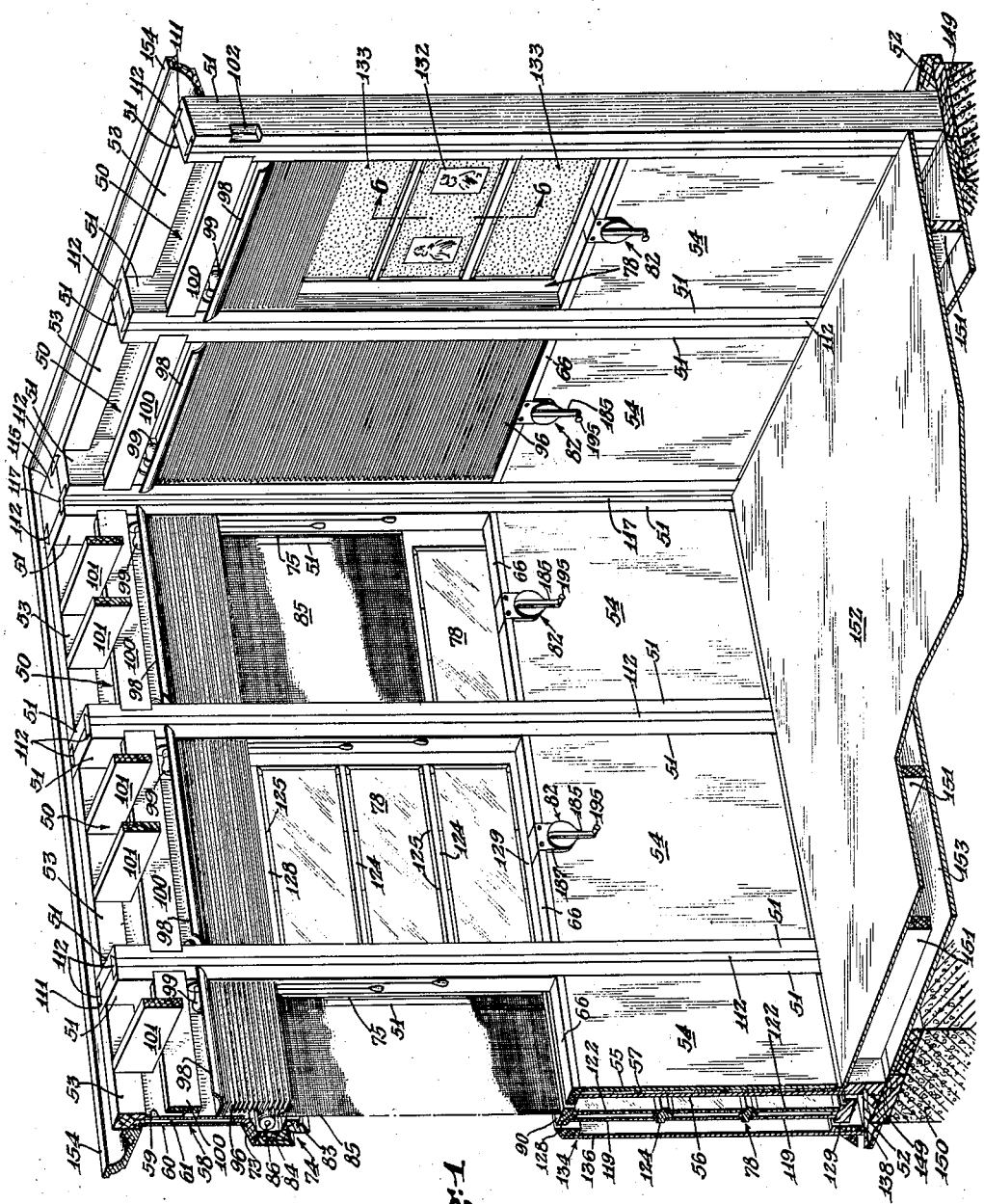
INVENTORS.
Edmund H. Lunken
George A. Just
BY
Sidney G. Faber
ATTORNEY.

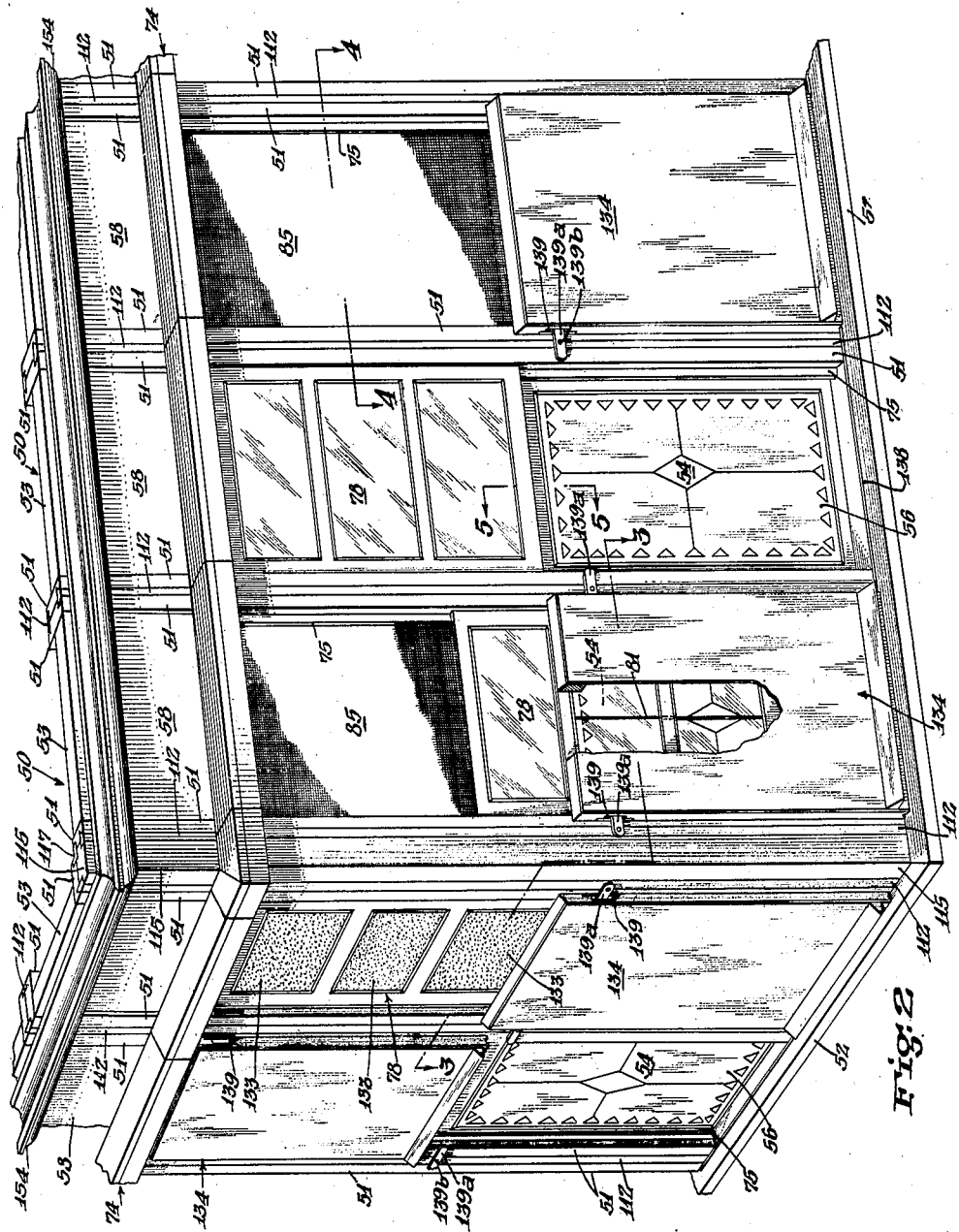

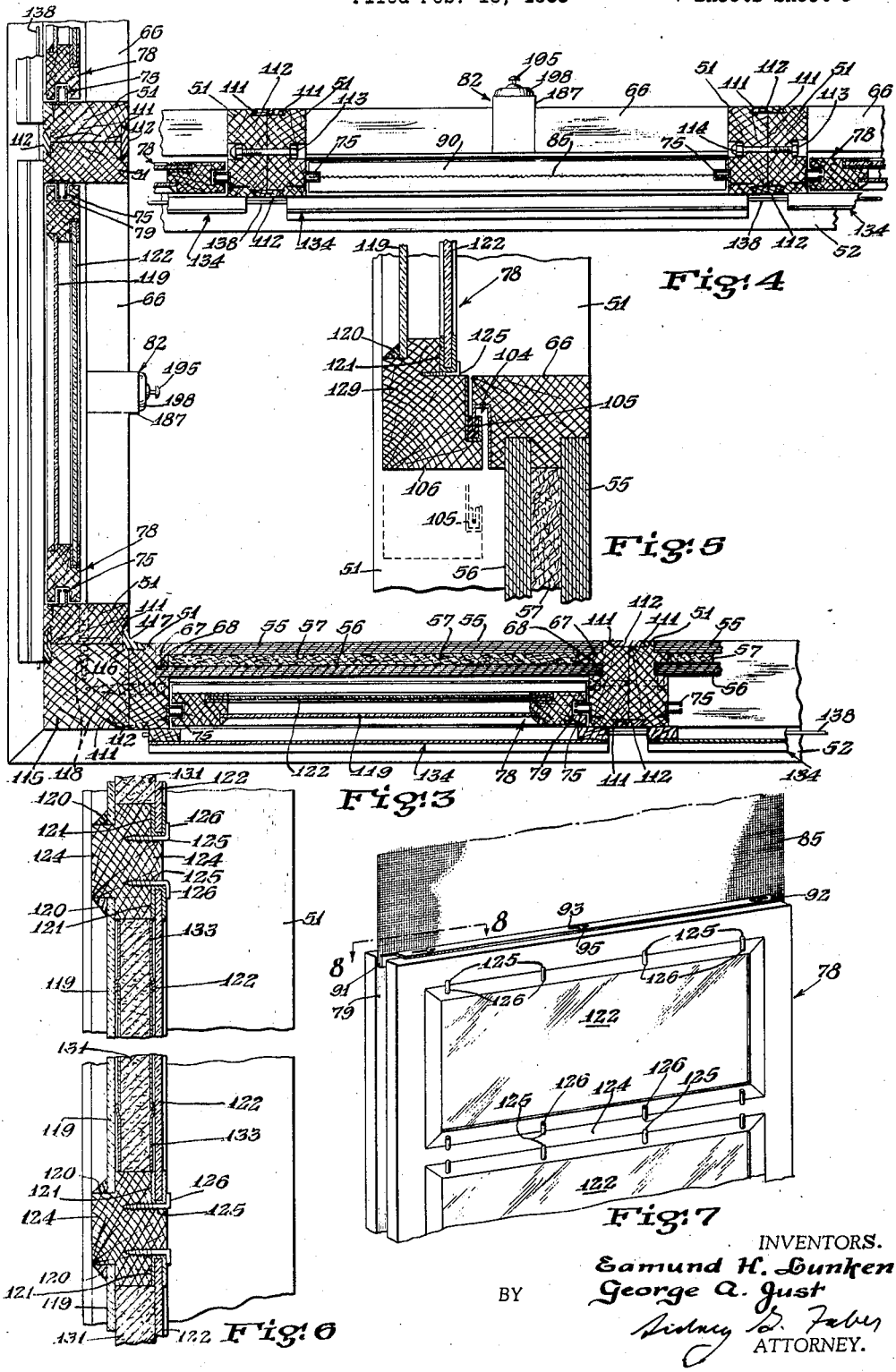

May 18, 1943.  E. H. LUNKEN ET AL  2,319,245

WINDOW

Filed Feb. 15, 1939  7 Sheets-Sheet 4

Fig. 13-a

INVENTORS.
Edmund H. Lunken
George A. Just
BY
Sidney D. Faby
ATTORNEY.

May 18, 1943. E. H. LUNKEN ET AL 2,319,245
WINDOW
Filed Feb. 15, 1939 7 Sheets-Sheet 5
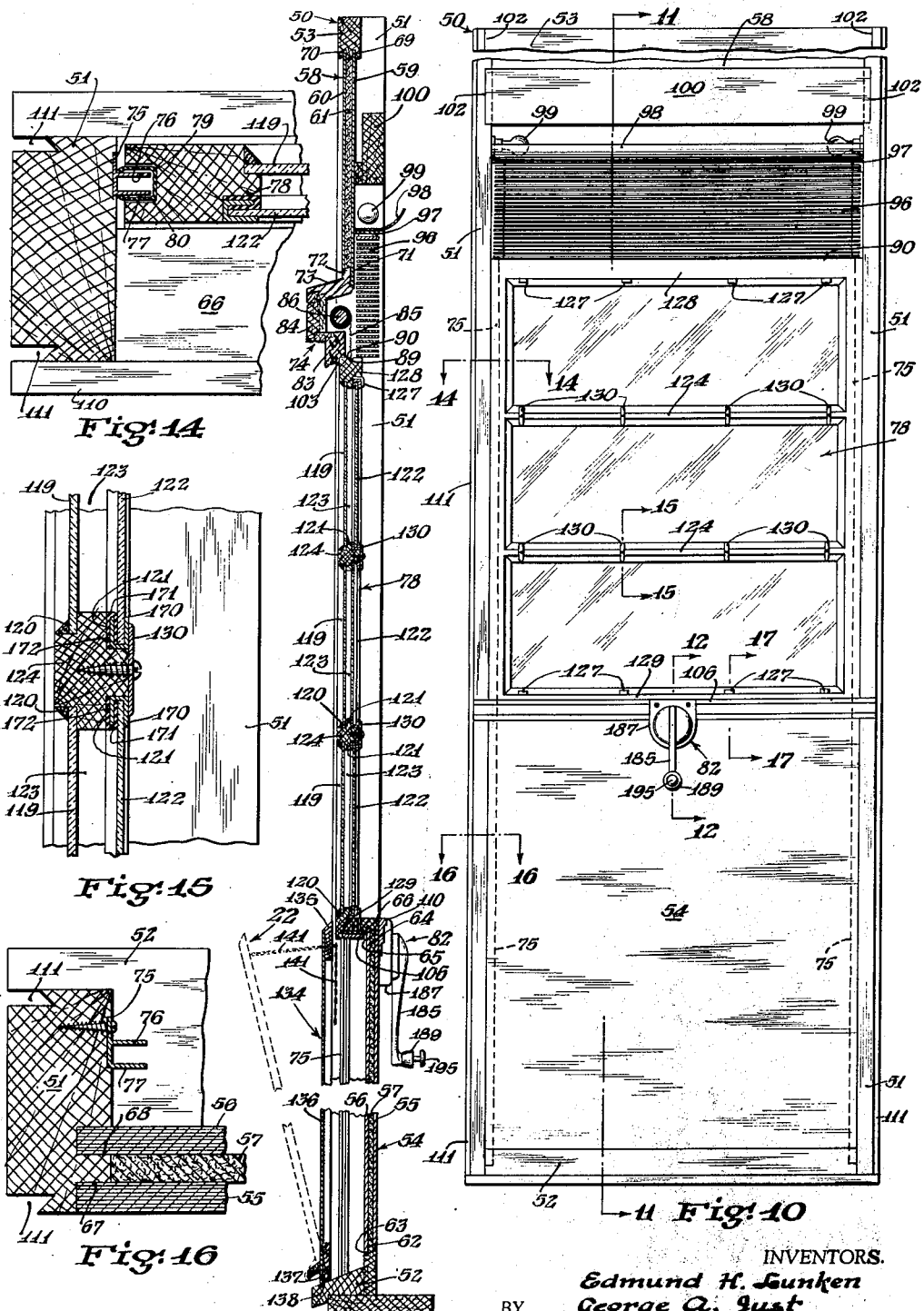
INVENTORS.
Edmund H. Lunken
George A. Just
BY
ATTORNEY.

May 18, 1943. E. H. LUNKEN ET AL 2,319,245
WINDOW
Filed Feb. 15, 1939 7 Sheets-Sheet 6

INVENTORS.
Edmund H. Lunken
George A. Just
BY
ATTORNEY.

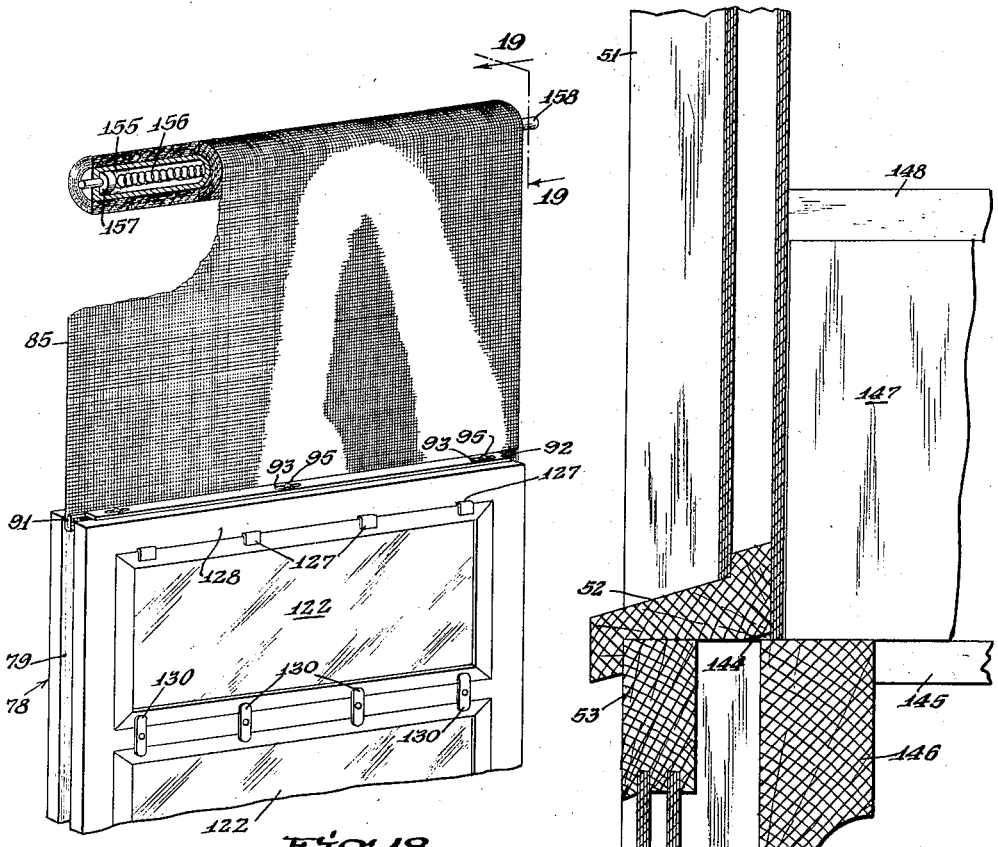
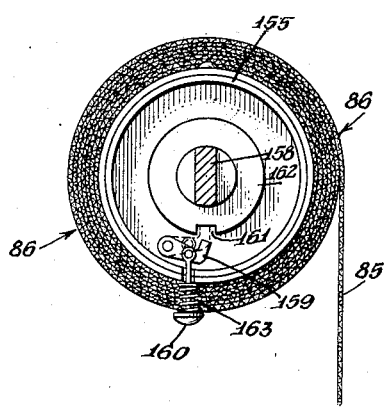

Patented May 18, 1943

2,319,245

UNITED STATES PATENT OFFICE 2,319,245

WINDOW

Edmund H. Lunken, Hartsdale, and George A. Just, Scarsdale, N. Y., assignors to Lunken-Just Window Corporation, Scarsdale, N. Y., a corporation of New York Application February 15, 1939, Serial No. 256,430

1 Claim. (Cl. 20—52)

This invention relates to window construction and more particularly to a type of window which requires no counterweights or balances, provides a much greater window opening than that present in the usual type of window, which lends itself readily to the insertion of a wire screen or mesh which may be operated by the sash, and in which the operation of rasing and lowering the sash is simplified and convenient. The construction of this window is generally based on that of Patents Nos. 1,695,598 and 1,845,304 in which were disclosed a form of construction wherein a single moving sash slides outside the spandrel itself.

In the double hung windows now in common use, the maximum vent obtainable is not more than half the height of the window frame itself; thus making an uneconomical construction wherein a greater window opening is required, and for which full length screens and storm sashes are necessary. Usually in the construction of sliding windows it is also necessary to provide counter-weights or other balancing arrangements for the purpose of counter-balancing the sashes.

The patents abovementioned disclose a window frame arrangement wherein a single sash effectively closes the window opening and at the same time the full opening of the vented portion of the frame may be utilized when desired.

It is now an object to provide a window of the general type of that disclosed in said patents; but one which requires no counter-weights or balances and which, therefore, requires no special frame, housing or weight boxes in the jambs, thus reducing the cost of the window.

Where screens are desired in vented portions of window openings, it has heretofore been found necessary to furnish a separate and usually adjustable screen to be placed over the window opening; and the window must then be constructed in such a manner as to receive the screen; or, in the case of roll screens, the window must be provided with additional guides therefor.

It is thus a further object of this invention to so arrange the sash in the unit or frame that whenever the sash is open, a screen will cover only that portion of the window which is open or vented. It is also an object to so arrange the screen that whenever desired, the window opening is freed of the screen, while the screen may nevertheless remain in such position with relation to the opening that it may automatically be set to cover said opening.

Another and important object of this invention is to provide simplified and convenient means for operating a window, such operating means being convenient in use, simple and economical in manufacture, not relying on the presence of counter-weights, spring balances, or other types of balances for its operation, and requiring a simple and inexpensive housing, rather than the complicated housings and constructions now in use.

Still another object is to simplify the arrangement of the window as a "storm window"; as well as to provide a simple arrangement which will facilitate the expeditious alteration of the window sash into a blank or ornamental wall space.

Heretofore, it has been found necessary, in the construction of buildings, to make special provision for window frames and to arrange the floor and wall supports to accommodate the windows. Such construction involves additional expense in order to support the walls and floors about and above the windows and thereby to prevent any loss in wall strength.

It is therefore a further object of this invention to construct a single unitary window frame, so proportioned and arranged that it will furnish support for the window opening and at the same time cooperate with the wall construction to the end that the finished wall, when the window frame is in place, will be complete, unitary, strong and supported without any special provision such as headers, spandrel framing or double studding being required for the window frame itself. In addition such window unit may even comprise load carrying members which will eliminate the usual studs in the frame of the building. Economy and simplified construction are thus primary objects of this invention.

Still a further object of this invention is to so construct the window units that a plurality of such units may, together, form a wall, without other framework, studs or supports being required; each of such units comprising the necessary studs and supports for the wall itself and even for the roof or the floor above.

It is a further object of this invention to so arrange the window unit and the window operator that it may, when desired be motor driven, preferably by electromechanical means.

Other objects and uses of this invention will, in part, be apparent, and, in part, be pointed out in the following description and drawings in which:

Figure 1 is an interior view in perspective, partially broken away, of an assembly of window units.

Figure 2 is an exterior view in perspective of said assembly.

Figure 3 is a cross-sectional view taken on the line 3—3 of Figure 2.

Figure 4 is a sectional elevation taken on the line 4—4 of Figure 2 and looking in the direction of the arrows.

Figure 5 is a cross-sectional view taken on the line 5—5 of Figure 2, showing a modified form.

Figure 6 is a cross-sectional view taken on the line 6—6 of Figure 1.

Figure 7 is a detailed interior view in perspective of a portion of one of the window units of Figure 1 showing the relationship between the wire mesh or screen and the window sash.

Figure 10 is an interior elevation of an individual window unit.

Figure 11 is a cross-sectional elevation taken on the line 11—11 of Figure 10 and looking in the direction of the arrows.

Figure 12:
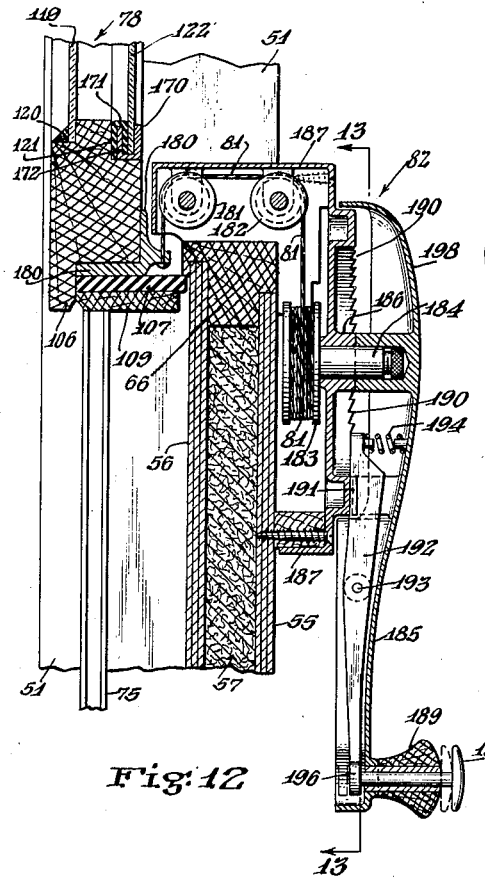
Figure 12 is a cross-sectional view taken on the line 12—12 of Figure 10 showing the details of the operation mechanism.
Figure 13:
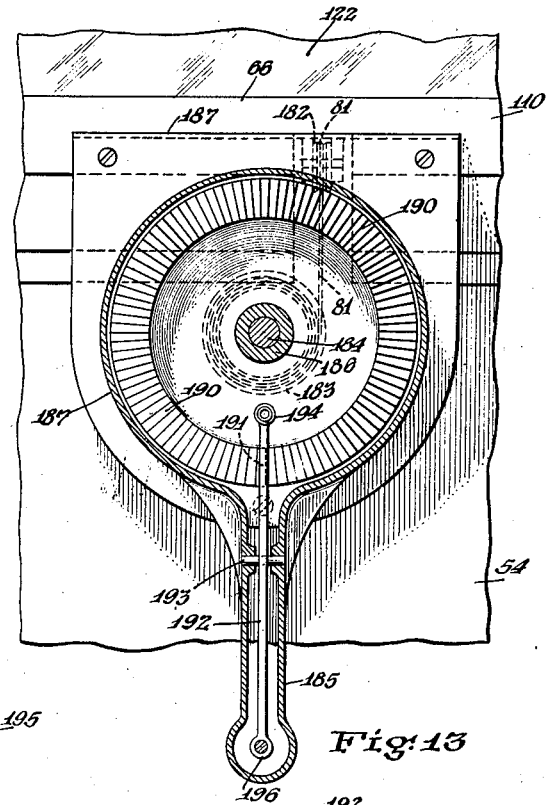
Figure 13 is a cross-section taken on the line 13—13 of Figure 12.

Figure 13—a is a cross-sectional detail of the ratchet and pawl engagement of the operator of Figures 12 and 13.

Figure 14 is a cross-section taken on the line 14—14 of Figure 10.

Figure 15 is a cross-section taken on the line 15—15 of Figure 10.

Figure 16 is a cross-section taken on the line 16—16 of Figure 10.

Figure 17:
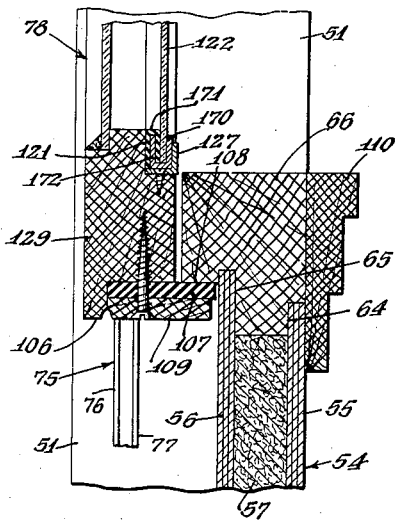

Figure 17 is a cross-section taken on the line 17—17 of Figure 10.

Figure 18 is a partial view in perspective of the upper portion of the sash and screen combination illustrating in part the spring mounting of the screen.

Figure 19 is a cross-sectional view on the line 19—19 of Figure 18.

Figure 20:
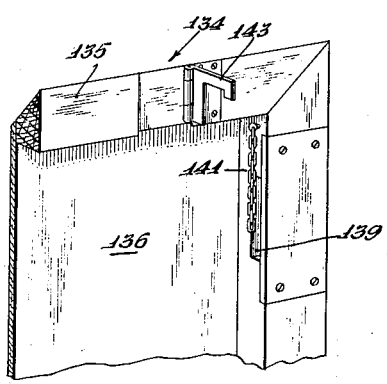

Figure 20 is a fragmentary view in perspective of an inside upper corner of the shutter taken at the area 22 of Figure 11.

Figure 21 is a fragmentary cross-sectional view showing the upper portion of a window unit and the lower portion of a window unit mounted upon it showing a method of joining two units when imposed upon each other to form a multi-storied building.

Figure 22:
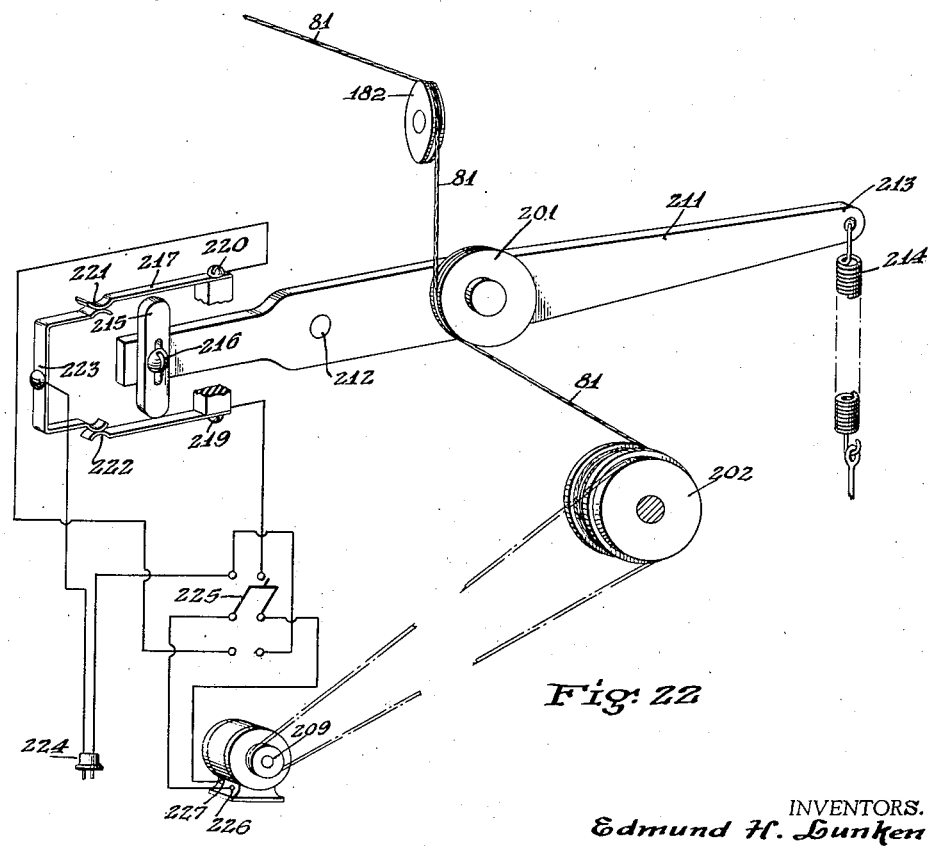

Figure 22 is a schematic view diagrammatically showing one form of electrically controlled operator which may be substituted for the operator of Figures 12 and 13.

In Figure 1, we have shown an interior view of a room, the wall of which is formed of an assembly of window units 50 of the type of Figures 10 and 11; and in Figure 2 we have shown an exterior view of a similar wall formed from units 50 of the same type.

Each window unit 50 (Figures 1, 2, 10 and 11) comprises jambs or studs 51, a sill 52 and a cap 53. A spandrel 54 extends between the jambs 51, 51 and rests upon the sill 52. The spandrel 54 as will be clearly seen in Figures 1 and 11, as well as in Figures 3 and 4 comprises preferably two spaced sheets 55 and 56 with a dead air space or insulation 57, such as rock wool but preferably sheet insulation, between them.

An upper spandrel or panel 58 may be mounted between the jambs 51 and abutting the cap 53 (see particularly Figure 11); the said upper panel likewise comprising two spaced sheets 59 and 60 having an insulating space 61 between them.

In both the spandrel 54 and the upper panel 58, the two spaced sheets may preferably consist of plywood, although they may be formed of any material which may be built, shaped, rolled or made into a sheet or structural panel. Thus, the outer sheet 56 of spandrel 54 may be a metallic member suitably ornamented as seen at 56, 56 of Figure 2 to harmonize with the appearance of the exterior of the building. The inner sheet 55 of the spandrel 54 may be painted or treated in any suitable manner to harmonize with the interior finish of the walls of the room.

The insulation 57 and 61 may consist of sheet insulation or of any type of common insulating material generally used in building construction.

The sheets 55 and 56 of the spandrel 54 may preferably be spaced from each other by their mounting against the rabbets 62 and 63 associated with the sill 52 and the rabbets 64 and 65 of the intermediate sill or cross-member 66 (cf. Figures 1, 11 and 13). Rabbets 67 and 68 may also be provided in the jambs or studs 51 (see particularly Figure 3), serving also to space the sheets along their lateral edges.

Similarly sheets 59 and 60 of the upper spandrel or panel 58 may be spaced from each other by grooves or rabbets 69 and 70 in the cap 53 and by rabbets 71 and 72 provided by the upper covering member 73 of the screen box 74 (see Figures 1 and 11).

In both the spandrel 54 and the upper panel 58, the sheets may also be spaced from each other and supported as well by suitable intermediate spacing members.

As will be seen more clearly in Figures 3, 14 and 16, a channel guide 75 comprising two flanges 76 and 77 is mounted vertically along each jamb or stud 51 and extends into the sash opening as well as below the sash opening and in front of spandrel 54.

A sliding sash 78 (Figures 1, 2, 3, 10, 11 and 14) is mounted between the jambs 51. The sash 78 is provided with a channel 79 along each vertical edge, said channel engaging the channel guide 75. The window sash 78 is thereby guided by the member 75 and limited to movement in a vertical plane only. Where it is desired weather stripping 80 may be placed in the channel 79 (cf. Figure 14) to obtain an improved weather seal.

The sliding window sash 78, as will more clearly be seen in Figures 2 and 12, is operated and supported by the cable 81 which is controlled by the operator 82 (Figures 10, 11, 12 and 13) hereinafter described in detail.

It will thus be seen that when the window sash is operated and supported by the cable 81 through the operator 82 (hereafter described), no counterweights or balancing of any kind are required; the window sash is fully supported by the cable; and the window sash may be lowered to such extent that the full available sash opening portion of the frame may be utilized for the admission of light and air. This is accomplished by the arrangement of the operating mechanism of Figures 12 and 13 as well as by the sliding of the single sash outside the spandrel 54 as seen in Figures 2 and 11.

Each window unit 50 may have integrally associated therewith a screen box 74 (Figure 11) mounted immediately above the head-stop 83 against which the window sash 78 abuts for closure. The cover 73 of the box and the head-stop 83 may be mounted between the studs 51 of each window unit. An outer facing member 84 may be supported between the cover 73 and the head-stop 83 to seal the outer side of the box 74. Said outer facing member 84 may be formed of spaced insulated sheets or may be an insulated metallic or wood panel to render that portion of the window unit as weatherproof as the remainder of the unit.

Instead of wood as shown the screen-box may be of stamped metal, formed as a single unit, and suitably insulated and flashed.

A screen 85 is releasably attached to the upper portion of the window sash 78 (cf. Figure 11) and is supported on the spring roller 86 which is in turn supported between the jambs 51, 51 (see also Figure 1).

Figure 8:
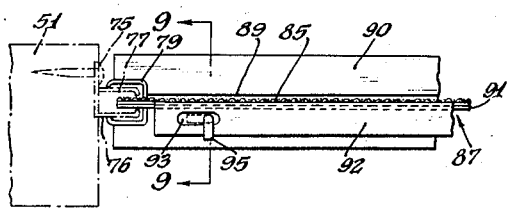
Figure 8 is a sectional elevation taken on the line 8—8 of Figure 7 and looking in the direction of the arrows.

As seen in Figures 4 and 8, the channel guide 75 serves also as a guide for the screen 85, the screen, as it unrolls from the roll 86 entering between the flanges 76 and 77 of the channel guide and being guided thereby. The lowering of the sash 78 serves thereby to draw the screen 85 into the opening thus created so that the open portion of the window may at all times be protected by a screen. The raising of the window sash permits the spring roll 86 (Figure 11) to rewind the screen and thus remove it from the window opening.

Figure 9:
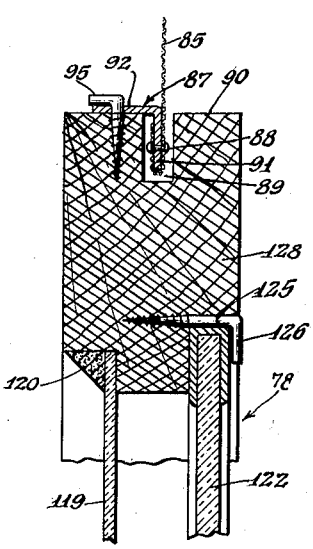
Figure 9 is a cross-sectional view taken on the line 9—9 of Figure 8.

As seen in Figures 8 and 9, the screen may readily be detached from the top of the window sash so that it may be wound on the roll 86 and remain in that position even when the window is lowered. The lower portion of the screen is attached to an angle member 87 in any suitable manner as by the rivets 88. A groove 89 is provided in the top rail 90 of the sash into which the leg 91 of the angle member may be set. The flange 92 of the angle member 87 comprises slots 93. Angular threaded hooks 94 may be mounted in the top 90 of the window sash and may be so arranged that the slots 93 are slidable over the heads 95 thereof, when the heads 95 are turned to a position indicated by the dotted line of Figure 8. Rotation of the heads 95 to the position shown by the solid lines of Figures 8 and 9 will thereafter serve to lock the flange 92 in place and thus attach the screen 85 to the window sash 78. The screen is thus usable or not at the option of the person in control of the window. We have shown but one preferred means for releasably attaching the screen to the top of the window; other similar means for accomplishing the same result will be obvious to those skilled in the art.

While the window sash and the sash opening provided therefor are thus larger than that in the usual sliding double hung window, there is nevertheless sufficient space above the vented portion of the window for the mounting of a Venetian blind in a position where it will not interfere with the operation of the window, and even for the arrangement of an indirect lighting system above the window vent. Venetian blinds 96 may be mounted on suitable brackets on studs 51, 51 being so arranged (see Figures 1, 10 and 11) that they cover the screen box 74 and the screen roll 86. When in use in connection with the window unit they occupy the relative position shown in Figure 11 where in the raised position they are completely out of the vented and light portion of the window and thus removed from any weathering which may be caused by the opening of the window and where no obstruction is furnished by the window sash to their being lowered. The indirect lighting system which may be manufactured with the window unit or which may be provided for attachment to the window unit comprises a base 97 (Figure 11) mounted between the studs 51, 51 and a reflecting surface 98 mounted on said base. Light fixtures 99 may be attached to the studs 51, 51 immediately above the reflector 98 or they may be mounted on the base 97 in any suitable manner.

The window unit 50 is preferably constructed with headers 100 mounted thereon so that support may be furnished for the ceiling or roof joists 101 (cf. Figures 1, 10 and 11). The headers 100 are mounted between the studs 51, 51, the studs being rabbeted at 102, 102 to provide a full bearing support for the headers.

A valance of plywood, drapery or other suitable material may be mounted between the studs 51, 51 or attached thereto when desired by the person arranging the interior of the room; said valance either covering the space between the ceiling joists and the bottom of the Venetian blinds (where no indirect lighting is desired) or being mounted below the light fixtures. Where the valance is of plywood, it may be hingedly mounted either on the studs or the headers 100 to facilitate the raising thereof in order to provide ready access to the mounting of the Venetian blind and screen.

The window may be weather stripped in any suitable manner; the weather stripping 80 (Figure 14) and the arrangement of the associated channel and channel guide providing adequate weather proofing along the vertical edges of the sash. Weather stripping may also be provided at 103 of the head-stop 83 to furnish a suitable seal between the top sash rail 90 of the window sash (cf. Figure 11) and said head-stop. And, as seen in Figures 1 and 5, the intermediate sill 66 may have a groove 104 to receive a similar member 105 on the bottom of the sash frame with suitable weather stripping material provided between them. In the preferred form, however, shown in Figures 11 and 17, the intermediate sill 66 of the vented portion of the window unit need have no special formation. The bottom sash rail 106 (Figure 17) of the window sash 78 carries a rubber weather strip 107 arranged to abut against the under surface 108 of the exterior portion of the sill 66. A support 109 immediately beneath the weather strip 107 serves to support it and to ensure that the weather strip is held tightly against the surface 108 when the window is closed. In either case and especially in the form shown in Figure 17, the weather strip is easily removable, and forms a wiper or insert seal between spandrel and sash.

As seen particularly in Figure 17, an ornamental facing strip 110 may be provided for the interior surface of the sill 66; or such interior facing strip 110 may be placed after the erection of the window unit across the inner faces of the studs to form an interior continuous ornamental horizontal stripe.

The studs 51, 51 of the window unit may cooperate with the other supports of the building itself and may even be similar thereto so that they may be used as a complete substitute for the supports usually placed around a window frame. Thus, where the vertical frame of the building consists of 2 x 4's, a similar dimensioning of the studs 51, 51 will serve to furnish complete support for the window unit, as well as floor or roof loads.

Window units may be placed together to form a wall as seen in Figures 1 and 2. In such a case, where the studs 51, 51 are each 2 x 4, the dimension of each supporting post of the wall thus formed is 4 x 4, giving all the strength that may be needed in any wall construction for dwelling purposes. Where it is desired thus to construct the window units to be readily combinable into a wall consisting only of such units, suitable means must be provided for uniting adjacent window units so that the members may retain all of their original strength and so that they will resist any of the disruptive forces usually placed upon a wall.

A preferred means for accomplishing this result is shown in Figures 1, 3 and 4, particularly in Figure 4, wherein each stud 51 is provided on its exterior and interior side and adjacent its outer lateral edges with angular grooves 111, 111. Splines 112 are mounted in the trapezoidal recesses formed by abutting grooves 111 of adjacent studs 51 and serve to provide an exceedingly efficient weather seal between the studs. Bolts 113, held in place by nuts 114, then serve to complete the rigid union of adjacent studs and to bind such studs together into virtually a single rigid unitary strong construction.

The window units of this invention may also, as seen in Figures 1 and 2, and particularly in Figure 3, be united together at corners without any special construction being required for the window unit or its studs. Thus, a corner post 115 may be provided (Figure 3) having the grooves 111 at the outside of the corner, and the recess 116 at the inside thereof. Splines 112 may be used as hereinbefore described in exactly the same manner at the outside of the corner; and a corner piece 117 having extensions shaped to fit into grooves 111 may be mounted in the recess 116 to engage the grooves 111 on the inside of the corner. Screws, nails or other suitable fastening means 118 may then be driven through the studs 51, 51 into the corner post 115, to thus complete the unitary structure.

The window sash 78 of the window unit 50 lends itself readily to the application of members which may convert it into a double glazed insulated sash. Thus, as seen in Figure 11, the sash 78 preferably comprises three panes of glass 119 permanently secured in place as by the putty 120. The inner portion of the frame of each pane is rabbeted at 121 (see Figures 11, 14, 15 and 6) to receive a removable pane 122. The dead air space 123 between the panes 119 and 122 provides the usual insulation for changing a sash into a double glazed sash or storm sash. It will, however, be noted that no cumbersome additional sash is required for the conversion of the window into a double glazed window; but, rather, three light panes of glass (comprising storm sashes) need merely be mounted in place. The mounting means may be varied as desired. Thus, as is seen in Figures 6 and 7, the horizontal frame portion 124 of each pane of the sash may have angular threaded hooks 125, the head 126 of which may be rotated to retain the storm pane or removable pane 122 in place. Or, as is seen in Figures 10, 11, 15 and 17, angle members 127 may be provided along the top rail 128 of the storm sash frame and along the bottom rail 129 of the lowest storm sash frame, the removable storm sash being set into said angle members; and the intermediate horizontal sash mullions 124 may have rotatable members 130 arranged to be turned into engaging position as shown in Figure 15 or rotatable to a horizontal position to permit release of the removable storm panes 122. Any other suitable fastening or retaining means may be provided in place of the rotatable members 130 within the spirit of this invention.

As seen clearly in the detailed view of Figure 17, each removable storm pane may have a frame 170 of metal, a U-shaped layer of rubber 171 being clamped over the leg 172 of the metallic channel and providing a suitable vibrationless and noiseless mounting for the removable storm pane as well as a tight air seal therefor.

As seen in Figures 1 and 6, this storm sash arrangement lends itself to many uses. Thus, where it is desired to turn a light transmitting unit into an opaque unit, and opaque filler 131, preferably of sheet insulation or of any other insulating material suitably and appropriately ornamented or colored may be mounted in the space 123 between the two panes. An opaque unit is produced in this way which has greater insulating qualities, a pleasant appearance, which may be lowered and which may readily be reconverted again into a light transmitting unit. As seen at 132, of Figure 1, pictures or ornaments may readily be mounted on the filler behind the glass of the removable pane, the original window pane serving as a frame for the pictures. Also, where desired, a suitable matting or other ornamental surface 133 (Figures 1 and 6) may be provided to set off the picture or ornament properly or provide an ornamental finish for the sheet; the whole furnishing a bright and pleasing assembly.

Each window unit may, where desirable, be furnished with a shutter 134 (Figures 1, 3, 11, and 20), the said shutter comprising a frame 135 and a surface 136 preferably of plywood. The base of the shutter may be grooved at 137 to register with the bead 138 mounted on the sill 52, the upper edge of the shutter being swingable as shown by the dotted lines of Figure 11, the shutter pivoting on said groove and bead. Each shutter may have slots 139 (cf. Figures 2 and 20) at the upper portion of the lateral edges thereof to receive the ends 139a of rotatable retaining means mounted on the splines 112 (cf. Figure 2), the engagement of the ends 139a in the slots 139 holding the shutter in fixed position against the outer faces of the studs 51 at the lower half of the window unit. The sash 78 then slides between the spandrel 54 and the shutter 134 when said sash is lowered. Suitable perforations as for instance slots may be provided at the base of the shutter and suitable cuts may be made in the bead 138 to allow for drainage. A releasable chain 141 (Figures 11 and 20) may be provided interengaging the upper end of the shutter and the stud 51 so that the shutter may be swung away to permit a person to lean out over the top of the window sash and intermediate sill to clean the outside of the sash.

Where it is desired to raise the shutter to the position shown at the left of Figure 2, hooks 143 (Figure 22) hingedly attached at the upper edge of the shutter 134 may be swung over the top edge of the sash, the raising of the sash then also raising the shutter. The angular top of the shutter matches the angle of headstop to provide a secure closure when the shutter is raised. Any suitable means may be provided for fastening the bottom of the shutter to the bottom of the sash or studs 51.

As will clearly be seen in Figure 21, the window units 50 may not only be used in the formation of a single wall for a one-story building, but may also be formed in pilaster arrangement to produce a plurality of stories, the studs 51 of the upper and lower window units abutting each other at 144. The sill 52 of one unit is arranged to rest upon the head cap 53 of the one below. In this arrangement, the ceiling 145 may be supported in a slightly higher position by the header 146 mounted between the studs 51. The floor 148 above may then be supported on joists 147 mounted on the header 146 and the ceiling 145 may be supported on the joists.

Each window unit may be constructed to a single standard since each unit may be interchangeably used in any position. As pointed out above, sufficient strength is furnished by the studs, particularly when they are placed together, to form the equivalents of 4 x 4's.

As seen in Figure 1, the lower end of the window unit may be mounted in any suitable manner; preferably so that the sill 52 rests upon a foundation plate 149 mounted on a suitable foundation 150. Floor joists 151 may be mounted on said foundation plate, a floor 152 laid thereon and cellar ceiling 153 attached thereto.

As already pointed out, a roof or an upper story may be readily mounted at the upper ends of the window units, and any ornamental or utilitarian structure may be mounted on the wall when completed, as for instance the gutter 154 (Figures 1 and 2). It will be noted in Figure 2 that the screen boxes 74 also tend to produce an ornamental and pleasing exterior cornice.

As seen particularly in Figures 18 and 19, the screen may be mounted on the conventional type of spring roller comprising an outer casing 155, a spring 156 attached at 157 to the interior of the casing and attached at the other end to the supporting member 158 which may rotate freely of the casing 155, so that an unwinding of the screen 85 will increase the tension of the spring when the member 158 is held stationary by its mounting in the bracket on the stud. The spring should be of sufficient length that the tension does not vary appreciably during a single full extension of the screen.

Where it is desired to increase the tension on the spring, the window sash may be dropped to its fullest extent, thus increasing the tension; pawl 159 may then by means of button 160, be manually pushed into slot 161 of the circular member 162 which is rigidly attached to the mounting means 158, where the tension of spring 156 resulting in a slight rotation of slot 161 may tend to hold the pawl 159 in place. With the pawl 159 thus in the slot 161, the roll 86 may then be removed from its mounting without any danger of the spring suddenly uncoiling. The roll 86 may then be wound up so that most of the extended screen 85 is upon it. The roll 86 may then be replaced, and the end of the screen pulled out once more and attached to the window sash.

The pawl 159 may be released after the roll 86 is mounted in place, by a slight jerk on the screen which will permit the spring 163 to pull the pawl out. The spring 156 now having in the fully wound up position of the screen the same tension as it previously had in the fully unrolled position will have even greater tension when it is later unrolled. The reverse procedure may obviously be followed to decrease the tension of the spring. And in any case where the screen end is detached from the window sash, the pawl 159 should be pushed in to prevent an unintended free unwinding of the spring 156.

The utility of the window units will now be obvious. The window units may readily be combined laterally into a single unitary wall structure, each portion of which is insulated and weatherproof. Instead of being required to form a wall to accommodate a window, a builder need merely insert the window unit in place of the wall structure at that point. And wall construction may entirely be obviated since the units themselves may be furnished with opaque sashes or the sashes may be rendered opaque in the manner hereinbefore pointed out. In such case, the user may turn any portion of his wall into a window, while, at the same time, the original formation and strength of the wall is retained.

Each window unit is so arranged that the cost thereof may well be less than the cost of a similar area of wall construction, so that in addition to providing the window sash in each section of the wall, the screen, the operator (hereinafter described) and the Venetian blind as well as the supports for the ceiling joists, the floor joists above and the wall above and the ornamental interior and exterior including the shutter, the expense of construction an entire wall of such units will be less than that of constructing a wall of similar area comprising similar advantages. And this becomes particularly of value in view of the fact that window units of the type herein described may be prefabricated in standard sizes and shapes at a manufacturing plant by mass production methods and shipped to the point of construction for combination by means of the splines and bolts hereinbefore described. In addition, the window unit as a whole and the parts thereof have increased salvage value when removed from the building wall.

The ability to furnish such prefabricated windows and wall units may well render obsolete many of the present construction methods involving the shipment of innumerable parts to the place of construction and innumerable field operations by hand on individual items thereat.

An important feature of the present invention lies in the simplified sash operator shown in Figures 1, 10 and 11 and in detail in Figures 12 and 13. It should be noted throughout that the use of such a simplified operator makes it unnecessary to furnish expensive, bulky or unsightly counterweights or complicated and easily disarranged balancing means and the necessary space consuming and wasteful housing therefor.

A cable 81 attached by a bracket 180 to the bottom rail of the sash 78 is led over pulleys 181 and 182 in the sill 66 to the drum 183. The drum is mounted on the shaft 184 which may be rotated by the handle 185. The shaft is mounted in bearing 186 which is carried by the housing 187 which is fitted on the sill 66. Rotation of the handle 185 by means of the knob 189 will thus result in a corresponding rotation of the drum 183, a winding up of the cable 81 and the raising of the sash 78. In order to ensure the locking of the sash in any desired position and to prevent the sash from falling of its own weight when it is raised, a ratchet arrangement may be provided consisting of a series of teeth 190 set circumferentially on the housing 187, engageable by the knife edge or pawl 191 of the lever 192.

Owing to the fact that the teeth 120 are set circumferentially, the pawl 191 will always be in engagement with one of said teeth no matter what the position of the handle 185 which carries such lever. The lever is pivoted at 193 within the handle 185, and spring 194 always maintains the pawl thereof in engagement with the teeth. When it is desired to raise the window, a grasping of the knob 189 and a depressing of the button 195 will depress the end 196 of the lever to the position shown by the dotted line of Figure 12, thus pressing the opposite end of the lever against the spring 194 and releasing the edge 191 from its engagement with the teeth 190. The window may then be raised or lowered by the rotation of the handle. The moment the knob 189 of the handle is released and thus the moment the button 195 is released, the spring 194 forces the pawl 191 into engagement with one of the teeth and holds the window sash in the position at which the turning operation of the handle has left it.

To insure engagement, the teeth 190 may have the form shown in Figure 13—a, the perpendicular edges 196 thereof being in position to resist a turning of the edge 191 in a direction to permit dropping of the sash. The window may thus be raised by a simple turning of the handle which will cause the edge 191 to slide up each incline 197 of each of the teeth. But to lower the window, it will be necessary to depress the button 195, and whenever the button 195 is released, the window will come to a stop. The outer surface of the handle may be extended as at 198 of Figure 12 to conceal any of the working parts of the operator which it is deemed desirable to conceal. The window may thus be raised, lowered or locked in place by the simple operator.

This simple arrangement involving the use of a single cable, two pulleys, a small drum, a handle and a ratchet arrangement, all of the relatively small size shown in Figures 10 and 11, and the cost of which is necessarily small, obviates the necessity for heavy, bulky and expensive locks, counterweights, counterweight housings or balances which decreases the useful window vent and provision for necessary support for the window housing.

Although this window operator is shown in connection with the window unit of the present invention for which it is especially fitted, it may of course be used with any type of window and with the windows described in the patents above-mentioned.

The operator of the type described in connection with Figures 12 and 13, while therein shown in a form best adapted for manual operation, may just as readily be adapted for any type of mechanical or electrical operation. Various methods of electrically rotating the drum 183 will be obvious to those skilled in the art. We prefer, however, to diagrammatically illustrate one method by which the said drum may be rotated for raising or lowering the window sash through the cable 81. Such method is shown in the schematic diagram of Figure 22 wherein the cable 81 attached to the bottom of the window sash is led over the pulley 182 past the idler 201 onto the wind-up drum 202. The idler 201 is rotatably mounted on the lever 211. The lever 211 rotates about its fulcrum 212, one end thereof 213 being engaged by the spring 214 which limits its rotation.

The opposite end of the lever carries an insulated non-electrically conductive member 215 fastened thereto in any suitable manner as, for instance, by the screw 216, permitting adjustment of the member 215. It will thus be noted that any increase in the pull of the cable 81 upon the idler 201 will cause the end 213 of the lever 211 to rise against the tension of the spring 214 while any decrease in the tension of the cable 81 upon the idler 201 will permit the spring 214 to drag the end 213 of the lever 211 in a downward direction.

Such motion will be translated through the fulcrum 212 to the opposite end of the lever where the member 215 will be caused to move in a correspondingly opposite direction. Where the wind-up drum 202 is caused to rotate in a direction for raising the window, then a certain tension equal approximately to the weight of the window sash will be applied upon the cable 81, thus tending to raise the idler 201. The spring 214 is adjusted to resist the rise of the end 213 of the lever when such normal tension is applied upon the idler 201 by the cable 81. When, however, the window is raised to the fully closed position, then any further rotation of the wind-up drum 202 will place increased tension upon cable 81 by reason of the fact that the sash has been brought to a complete stop. Such increased tension will thus cause the cable 81 to straighten out, thereby raising the idler 201 and the end 213 of the lever 211 against the tension of spring 214. This will correspondingly cause the insulated member 215 at the opposite end of the lever 211 to be depressed.

Any suitable snubbing arrangement may be provided to resist the tendency of the lever 211 to "hunt" a balancing position when the raising or lowering operation is commenced.

When the window is thereafter lowered, the full weight of the window is still borne on the cable 81 so that the idler 201 tends to remain in the selected position. When, however, the window sash reaches the bottom of its path, then the weight of the window sash is no longer borne by the cable 81 so that the cable furnishes no resistance to the tendency of the spring 214 to drag the end 213 of the lever arm 211 and the idler pulley 201 in a downward direction and the insulated member 215 is correspondingly caused to rise.

When therefore, an electrical motor 209 is connected in any suitable manner to drive the drum 202, then, when the circuit is made from the terminals 226 and 227 of the motor through the double throw double pole switch 225 and the power supply 224 through the member 223 to the spring switch 222 mounted by the member 219, the motor rotates in a direction to wind-up the cable 81 on the drum and thus raise the window. When the window sash is fully raised and increased tension upon the cable 81 causes the depression of the member 215 in a manner hereinbefore described, the member 215 then bears against the switch 222 and breaks the circuit at that point to the motor thus stopping the rotation of the motor and therefore the rotation of the drum.

When, thereafter, the double throw, double pole switch is then turned to engage the opposite circuit, the polarity of the motor is reversed, the motor rotates in the opposite direction, connection having been made through the spring switch 221 mounted by the member 220 and through the member 223 to the motor 209. When the window is thereafter, by this lowering action of the motor, brought to a stop at the bottom of its path, the decrease in the tension on the cable 81 permits the member 215 to rise in the manner hereinbefore described to bear against the switch 217, thus breaking the contact 221 and thus breaking the circuit to the motor, thereby halting the rotation of drum 202.

By this means, the wind-up cable, tape or chain, 81 and the associated drum may thus be connected in a manner to be electrically operated. Suitable releasable braking mechanism may be applied on the shaft of the motor 209 or upon the shaft of the drum 202 or at any other desired position, such braking mechanism being, if desired, operated by a solenoid in the electrical circuit, said solenoid being actuated to release the brake when any circuit is closed through the double throw, double pole switch 225, or the drum 202 may be geared directly to the motor through worms or worm gears of sufficiently high gear ratio to be self locking.

The connection between the motor 209 and the drum 202 may be made by appropriate gearing, by belt drive, or by any other suitable means. The electrical motor 209 and the accompanying electrical circuit is shown merely as an illustration of one method of electrically operating the sash raising and lowering device. Other methods using other types of motors and other types of circuits will be obvious to those skilled in the art.

A single motor may be used in connection with and to control the sash of a single window unit or the sashes of a plurality of window units; or a single switching mechanism may be used to control a plurality of motors each mounted on and operating an individual window unit; or individual switches and motors may be provided for each window unit, and remote control of the motors and operators may also be provided; as well as automatic trips to close the windows during a rain storm and operated by a suitable water-trip or capsule.

As hereinbefore pointed out, our invention may take many forms. The window units, the studs, the switches, the shutters, the screen and the drive therefor may be varied and modified in accordance with particular uses. We prefer, therefore, to be limited, not by the specific disclosure, but only by the appended claim.

We claim:

A window unit comprising studs; a spandrel extending between the studs at the lower portion thereof, a sash positioned outside the spandrel and slidable along the studs below the floor line and a positive drive for said sash, and a shutter selectively mounted at the bottom of the window unit opposite and at a spaced distance from said spandrel to provide a shield for said sash when lowered and attachable to said sash whereby it may be raised with said sash to provide a shutter for the sash when raised.

EDMUND H. LUNKEN.
GEORGE A. JUST.